May 15, 1928.
T. A. SIMONS
1,670,050
FOOT PEDAL SWITCH FOR TRAFFIC SIGNALS
Filed March 12, 1924
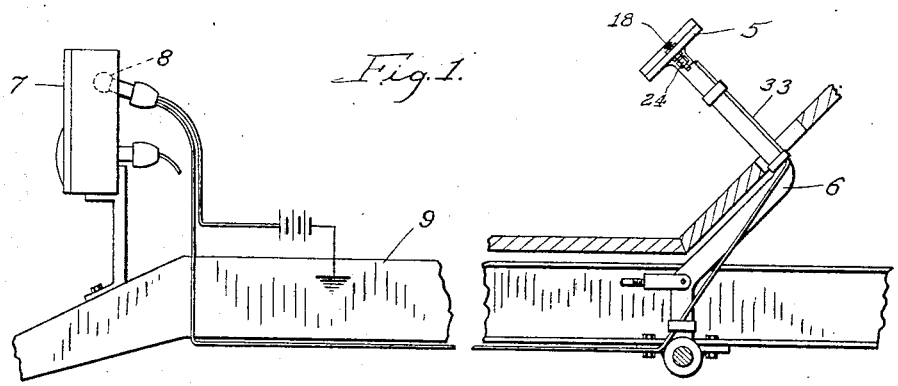
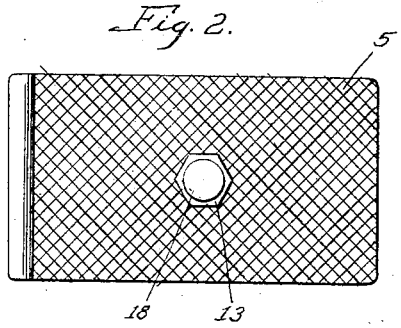
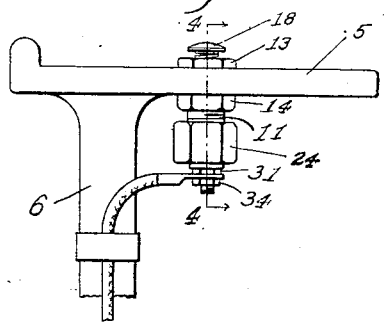
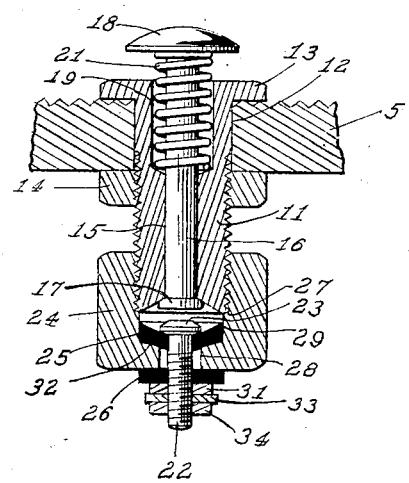
Inventor
Thomas A. Simons
By Wilson & McCanna
Attys.

Patented May 15, 1928.

1,670,050

UNITED STATES PATENT OFFICE.

THOMAS A. SIMONS, OF ROCKFORD, ILLINOIS.

FOOT-PEDAL SWITCH FOR TRAFFIC SIGNALS.

Application filed March 12, 1924. Serial No. 698,726.

This invention pertains in general to electric circuit makers and breakers and to a special application thereof, namely, a switch especially adapted to be mounted on a foot pedal of a motor vehicle for opening and closing a circuit including a traffic signal device, such as a stop signal or the like.

The primary purpose of my invention is to provide a switch which may be readily mounted on a foot pedal, preferably by drilling a comparatively small hole through the foot or pressure plate thereof and inserting the body part of the switch and securing it in position. The electric circuit including the signal device, is grounded on the car chassis so that said body part of the switch which is connected to the foot pedal becomes one terminal at the contact making point in the circuit. According to my invention said body part carries a slidable contact member which is the actual terminal on the grounded side and further carries beneath the foot plate a fixed insulated contact member constituting the other terminal, the slidable contact member being adapted to be depressed by foot pressure for closing the circuit and to be raised by spring pressure for opening it.

My invention further consists in the novel construction of these parts, which construction is desirable and advantageous because of the small space it occupies on a pedal, and further because of its comparatively low cost of production and installation.

Other objects and attendant advantages will be appreciated as the invention becomes better understood by reference to the following description when considered in connection with the accompanying drawings, in which—

Figure 1, is a side elevation partly diagrammatic, of the essential parts of an electric circuit embodying my invention;

Fig. 2, is a face view of a foot pedal equipped with a switch embodying my invention;

Fig. 3, is a front edge view of the foot pedal and switch; and

Fig. 4, is an enlarged section taken on the line 4—4 of Fig. 3.

My invention more particularly, consists in the special application of my improved switch to the pressure or tread plate 5 of a foot pedal 6, preferably the brake pedal of a motor vehicle, the switch being adapted for opening and closing a circuit including a signal device designated generally by 7, at present positioned on the rear portion of the vehicle. This signal device includes an incandescent light bulb 8 for illuminating a stop signal. The electric light circuit is grounded on the chassis as on the channel frame 9 thereof, thus making the brake pedal 6 one terminal of the circuit. The circuit is adapted to be closed by my improved switch which is preferably centrally mounted on the pressure plate 5 so as to be operated by foot pressure simultaneously with applying the brake, or independently of such braking action. This provides a positive, automatic signal when braking the car, and also an optionally operable signal as distinguished from those constructions in which the stop signal is operable only when braking the car.

The switch comprises a hollow elongated plug or body part designated generally by 11 inserted through a hole 12 bored in the pressure plate 5, preferably about midway between the front and rear edges thereof, so that the foot operable member of the switch will always be engaged by the foot when operating the brake. Said body part is formed at one end with a head 13 which bears against the top face of the pressure plate 5 and is externally threaded at its opposite end and preferably throughout substantially its entire length, said body part may either be threaded directly into the plate 5 or it may be equipped, as shown, with a nut 14 which is adapted to be tightened against the under side of said plate for rigidly securing the body part thereto. Said body is bored axially at 15 providing bearing support for a plunger contact member 16. Said member has its inner end upset or spread to provide a contact head 17 or the equivalent, at its lower end beneath the body part 11 and has a foot pressure head 18 or the equivalent, at its opposite end above said body part. The bore in the body part is enlarged near its upper end as at 19 to receive and house a coiled compression spring 21 which acts between the body part and the head 18 and constantly urges the plunger contact member to a circuit-opening position in which its contact head 17 strikes against the under end of the body part 11 and limits further upward movement. The member 16 by reason of its contact with the pedal is therefore a movable terminal adapted to be operated by foot pressure for closing the signal circuit and by spring pressure for opening it.

The other switch terminal is at present in the form of a comparatively short binding post 22 having a contact head 23, carried coaxially with but spaced from the member 16 by means of a gland nut 24 and insulation discs or washers 25 and 26. The nut 24 threaded on the part 11, is drawn up tight against a shoulder 27 so as to secure the desired separation of the contact faces. The binding post 22 passes through a hole 28 in the nut 24 and is held centrally within such hole both by contact of the insulation disc 25 with the internal wall of the bore 29 in said nut and by the centering effect produced by tightening the binding post nut 31, which slightly dishes the disc 25 in drawing it against the tapered face 32 at the bottom end of the bore 29. The electric wire 33 forming part of the circuit is attached to the binding post 22 by a nut 34.

From the foregoing it will be manifest that each contact member 16 and 22 is assembled in an independent structure, the member 16 in the body part 11 and the member 22 in the nut 24. This greatly facilitates assembling the switch on the clutch pedal since the body part may be first installed, at present by simply inserting it through the opening 12 and tightening the nut 14. The switch assembly may then be completed by screwing the nut 24 onto the lower end of the body 11. A construction such as described is thoroughly practical for the purposes intended, and comprises such few parts so designed as to enable production thereof at a comparatively low cost.

It is believed that the foregoing conveys a clear understanding of the objects prefaced above and while I have illustrated but a single working embodiment it should be understood that many changes might be made in details of construction without departing from the spirit and scope of the invention as expressed in the appended claim, in which—

I claim:

In a foot pedal traffic signal switch comprising an elongated hollow plug threaded externally whereby to be mounted in an opening in the tread of a foot pedal, and having a spring-projected contact operating therein projecting normally from the plug for depression by treading on the pedal substantially as herein described, a combined contact and binding post assembly for said foot-depressed contact comprising a gland nut threading on the lower end of said plug, a headed and threaded contact and binding post element having its headed end inside said nut with the threaded end projecting outwardly through an opening provided in said nut, the said opening being substantially larger in diameter than said element, insulation washers on said element beneath the head thereof in said nut and on the outside of said nut for holding said element centrally spaced in the opening in said nut and insulated therefrom, and nuts on said element for securing the same in said gland nut and for providing electrical connections with said element.

THOMAS A. SIMONS.